Patented Dec. 13, 1932

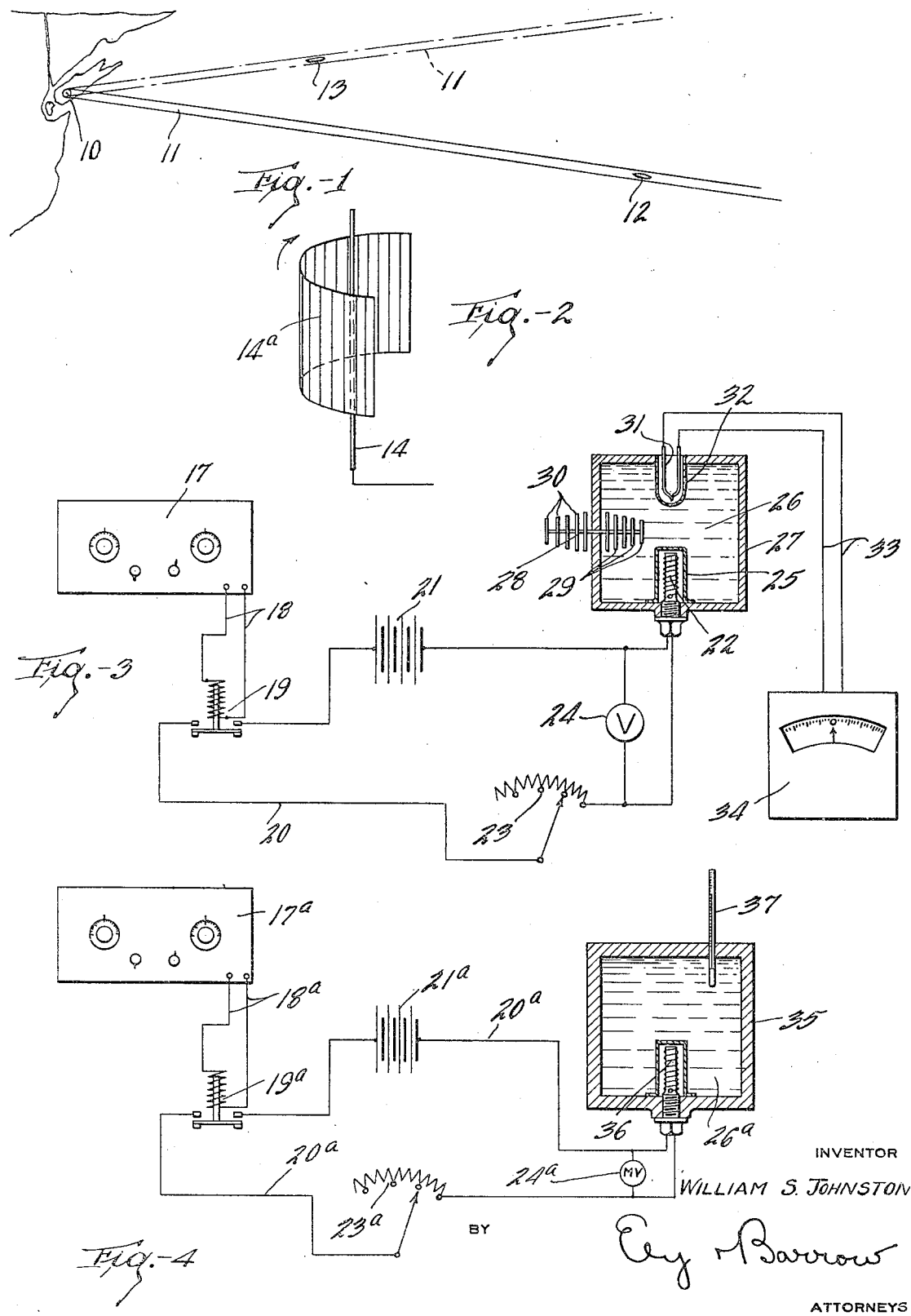

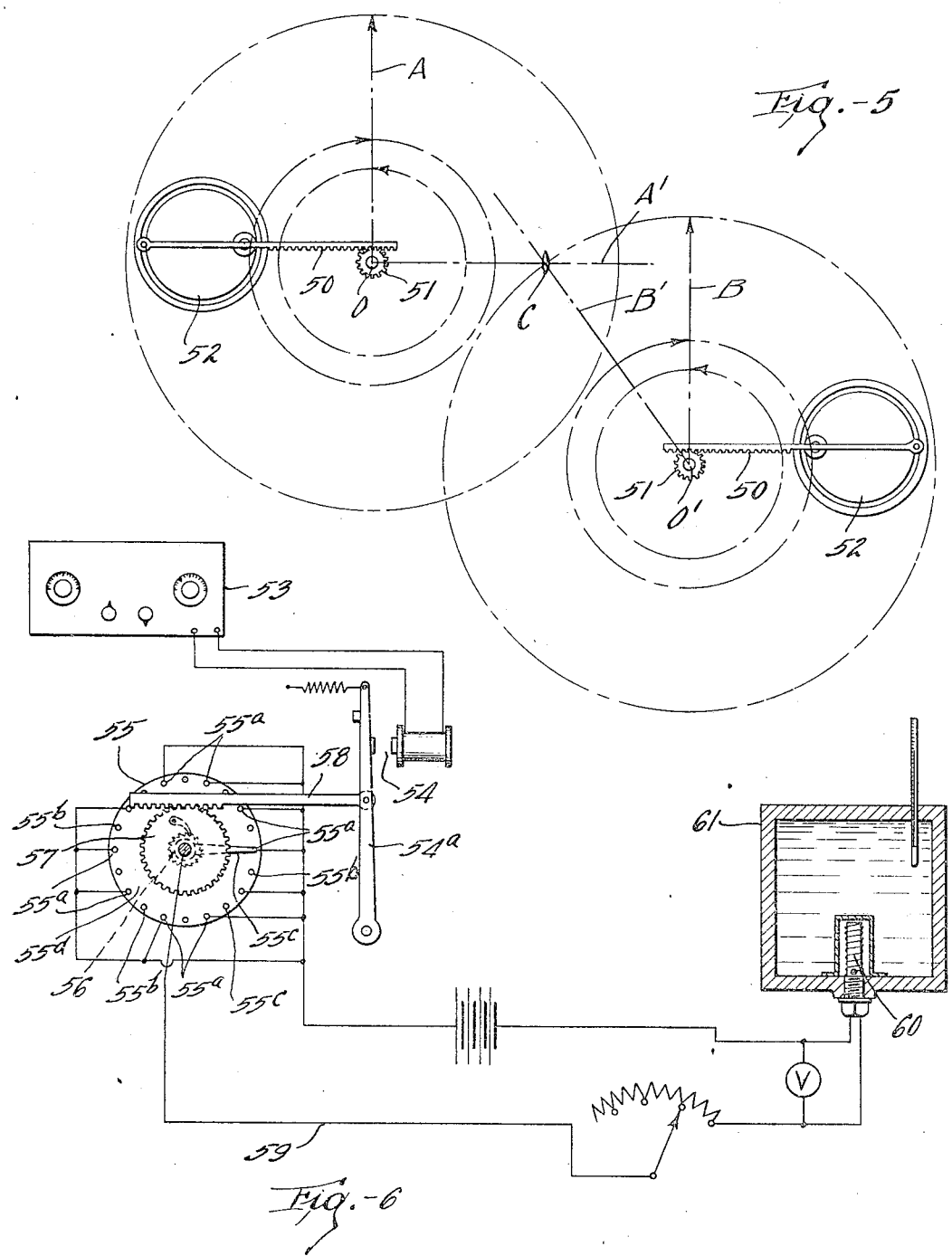

1,890,786

UNITED STATES PATENT OFFICE

WILLIAM S. JOHNSTON, OF AKRON, OHIO

RADIO DISTANCE OR LOCATION FINDER

Application filed March 3, 1930. Serial No. 432,782.

This invention relates to methods and apparatus for distance or location determination by radio.

The directed or beam radio has come into quite successful use in the marking out of courses or routes, mainly in air transportation systems, and suggestions have been heretofore made for the use of radio signals to determine distance. So far as is known, however, distance determination by radio heretofore has not been commercially successful.

Focused beam radios heretofore have been provided and beam radios have also been erected on angularly adjustable supports to adjust the direction of the beam or to oscillate the beams, but, in accordance with one phase of the present invention, it is proposed to provide a rotary support for a focused beam radio apparatus of any suitable construction and continuously to rotate said beam radio at a uniform rate to cause its beam to sweep a circular area within receiving distance of the radio station.

A ship, airship or airplane at a distance from said station is accordingly swept by the beam during a period of time during each revolution of the beam which is a function of the width of the beam and the distance of the signal receiving vessel, ship or plane from the station, it being obvious that the greater the distance of the receiver from the station the faster the beam will sweep the ship because of the greater arc over which the beam rotates at that distance, the time of sweeping of the beam over the receiver being affected, of course, by variation at different distances in the width of the beam. This variation may be computed and the distance determination corrected or the receiving devices may be calibrated at various known distances from the station.

It is proposed to indicate or measure the time of the signal when the beam is sweeping the receiver by suitable apparatus in which the received impulses may be converted into heat and the heat produced being in turn measured by the use of thermal measuring means such as a calorimeter and this calorimeter in the preferred form of the invention is provided with a given leak and thermo-electrical measuring instruments so arranged that the heat required to be added to the calorimeter to balance the leak is obtained from a circuit closed by the incoming signal, the lesser the time which this circuit is established by the incoming signals the greater the voltage or current required in the circuit to maintain the balanced condition in the calorimeter. Accordingly a rheostat in said circuit may be provided to adjust the circuit to deliver the required heat and the voltage or current required is directly proportional to the distance. A millivoltmeter in this circuit, for example, may be calibrated in distances which may be directly read therefrom. Of course variations in the atmospheric temperature will vary the flow of heat through the leak and the receiving apparatus must be calibrated at known temperatures and a number of distance scales may be provided for the range of atmospheric temperatures, scales for each five degrees of temperature range being suggested.

The invention so far as conversion of the signal into heat and measuring by thermal means is concerned is also capable of application in direction finding equipment in which a beam, whether focused or not, is caused to oscillate and the direction determined by the proportional times required for oscillation of the beam from the receiver to and from the limits of oscillation.

The invention will be better understood upon consideration of the accompanying drawings illustrating the same and the following description, it being understood that the invention is not wholly limited to the specific forms thereof disclosed.

Of the accompanying drawings,

Figure 1 is a diagrammatic view indicating a station on land sending a revolving focused radio beam over an area whereby it sweeps two vessels such as ships at different distances at sea;

Figure 2 is a diagrammatic elevation showing a focused beam radio antenna which may be revolved as indicated by the arrow;

Figure 3 is a diagrammatic view of the preferred form of receiving apparatus;

Figure 4 is a similar view of another form of receiving apparatus;

Figure 5 is a diagrammatic view showing two oscillating beam radio stations and illustrating the method of determining location of a vessel or the like from signals received therefrom; and Figure 6 is a diagrammatic view of a suitable receiving apparatus for determining the directions of the receiver from said stations.

Referring to Figure 1, the numeral 10 designates a radio station sending out a rotating focused beam 11 sweeping the sea, two ships 12 and 13 being shown as swept by said beam at different distances from the station.

A suitable focused beam radio 14 which may include the parabolic or other reflecting antenna 14$^a$ suitably shielded to prevent the transmission of divergent rays of any considerable intensity is rotated continuously at a substantially constant or uniform rate at said station, an asynchronous motor being preferably used for this purpose.

A suitable receiver 17 may be provided on the receiving vessels or ships which can be tuned to the frequency of the sending station and the speaker or phone circuit of said receiver may be connected by leads 18, 18 with a suitable delicate relay 19 arranged in a circuit 20 including a source of electrical energy such as a battery 21, a heating element 22, a rheostat or potentiometer 23 and a suitable electrical measuring instrument such as a millivoltmeter 24 connected across the heating element, this millivoltmeter being in the preferred form provided with a scale in distances at various atmospheric temperatures.

The heating element 22 is shown arranged in a heat conducting casing 25 in a body of liquid 26 enclosed in a heat-insulated vessel 27 provided with a leak which may take the form of a rod of conducting material 28 extending through the vessel with fins 29 thereon in the liquid 26 and fins 30 thereon exposed to the atmosphere.

A thermocouple or thermopile 31 is arranged in a heat-conducting casing 32 also extending into the liquid 26 in vessel 27 and is connected by leads 33, 33 to a galvanometer 34.

It will be apparent that when the receiving set is tuned to the transmitting station, the relay 19 will be closed as the beam sweeps the receiver setting up a current in circuit 20 which will heat element 22. If rheostat 23 is now so adjusted that the heat supplied by the heating element 26 is all dissipated by the leak 28 under which conditions the galvanometer connected to thermocouple 32 would indicate no deflection, the voltage under these conditions effective on the millivoltmeter 24 will indicate the distance of the receiver from the transmitter, it being obvious that the greater the distance the more voltage will be required to balance the calorimeter because the time the current flows will be less due to faster movement of the beam at greater distances.

Instead of depending upon a balancing of ingress and emission of heat to and from the calorimeter 27, the quantitative value of the added heat may be determined by the use of a calorimeter 35 (Figure 4) having a heating element 36 in a circuit 20$^a$ similar to circuit 20 and similarly connected with a receiver 17$^a$. If liquid 26$^a$ in this calorimeter is originally maintained at a known temperature, say 0° C., the melting point of ice, then the temperature to which it will be raised by reason of the actuation of circuit 20$^a$ by the beam over a given period of time will be inversely proportional to the distance, provided, of course, the voltage and current in the circuit are adjusted to and maintained at the same predetermined values for the readings at various distances. Accordingly, the greater the distance the lesser will be the heat developed in the calorimeter in a given period of time. The temperature at the beginning and end of this period of time may be measured as by a thermometer 37 and the degrees of temperature rise or the units of heat developed can be referred to a chart or scale showing the corresponding distances.

It will, of course, be apparent that a vessel or ship may locate itself accurately by taking distance readings on three stations and can determine its location at either one of two points by taking readings upon two stations where the arcs of the two beams passing over the ship would intersect. In the latter case, the two points will usually be so far apart that the pilot may know from other determinations which of the two positions is his. A reading on only one station may also be sufficient to locate the receiver if some form of directional receiving device is utilized to determine the direction of the incoming signal.

Maps may be provided when this system is used with concentric circles arranged at various radii about the various stations to assist in charting the position of the receiver.

It will be apparent from the foregoing that the above system is not dependent upon the signal strength, i. e. if the vessel is in receiving distance of the station at all variations in signal strength will not affect the results so long as the signal is sufficiently strong to actuate the delicate relay.

It will also be understood that all of the benefits of the above invention would not be sacrificed by provision of some other apparatus for determining the durations of the signal at various distances as the beam sweeps the receiver.

A similar measuring method and apparatus may be provided for determining direction or location of a receiver by the reception of signals from one or more oscillating beam stations. It is preferred to make these determinations by the use of stations at which the beam is caused to oscillate angularly from one direction such as north a full 360° until it is again in said direction and then back so that the signal may be received in all directions from the sending stations.

In Figure 5 there is indicated two stations O and O' at which beams A and B may be so oscillated as indicated by the curved arrows appearing in said views. The transmitters at O and O' may be oscillated at uniform rate by suitable means such as a reciprocable rack 50 engaging a gear 51 secured to a rotatable support (not shown) for the beam transmitter (not shown), the rack 50 being reciprocable as by a continuously driven cam 52.

If a receiver is at C it will be apparent that the time required for the beam to sweep clockwise from OA' to OA and back to OA' will be longer than the time required for the beam to sweep from OA' counter-clockwise to OA and back to OA' in proportion to the difference of the angles between the OA' and OA positions in the opposite directions. Similarly the times required for beam B to sweep from O'B' to O'B clockwise and then back to the position O'B' and then to sweep counter-clockwise from O'B' to O'B and back to O'B' will be proportional to the difference in angles of O'B to OB considered in the opposite directions.

As shown in Figure 6, the receiver at C may be any desirable radio receiving set 53 which may be turned to the frequency of either station O or O' and the phone or speaker circuit of which may be connected to a suitable delicate relay 54 adapted to operate a suitable switch 55 arranged to be alternately closed and opened by the relay. This switch may have contact points 55ª and non-contact points 55ᵇ alternately arranged between which the movable element 55ᶜ may be actuated on each actuation of relay 54 as by actuating element 55ᵈ through a ratchet device 56 in turn operable by a gear 57 with which is meshed a rack 58 operable by the movable element 54ª of relay 54.

The switch element 55ᶜ may be connected to one side and the contact points 55ª to the other side of a circuit 59 similar to circuits 20 and 20ª in which a heating element 60 is arranged in a calorimeter 61 which may be used in either of the ways illustrated in Figures 3 and 4 as described above, the voltmeter as in Figure 3 being calibrated in degrees.

It will be apparent that the amount of heat developed in unit 60 will be proportional to the magnitude of the angle at which the beam is in passing over the ship with relation to the known direction from and to which the beam oscillates. Of course, a reading of 60° may indicate a direction of 60° either clockwise or counter-clockwise from said known direction, but the proper direction may be determined either by knowledge of the general location of the receiver or by obtaining readings on several stations by which the location is accurately determined. For example, an air or sea vessel between stations O and O' would easily ascertain its position at C.

Maps may be provided when this system is used in which lines radiate from the various sending stations to assist in charting the position of the receiver.

Modifications of the invention other than those disclosed herein may be resorted to without departing from the spirit thereof or the scope of the appended claims.

What is claimed is:—

1. That method of determining distances by radio which comprises rotating a focused radio beam at one point and measuring the duration of the signal received at another point by converting said signal into heat and measuring the heat developed in a given period of time.

2. That method of determining distances by radio which comprises rotating a focused radio beam at one point, causing the signal received from said beam at another point to set up an electric current in a circuit during the period the beam sweeps said other point and measuring the duration of said current by converting said current to heat and measuring the heat developed.

3. That method of determining distances by radio which comprises rotating a focused radio beam at one point, causing the signal received from said beam at another point to set up an electric current in a circuit during the period the beam sweeps said other point and measuring the duration of said current by converting the current to heat and supplying the heat to a calorimeter to measure the same.

4. That method of determining distances by radio which comprises rotating a focused radio beam at one point and measuring the duration of the signal received at another point by converting said signal into an electric current and converting the current into heat and measuring the heat developed in a given period of time, by supplying the heat to a calorimeter, dissipating heat from the calorimeter by a constant leak and measuring the electricity necessary in said current to supply heat to the calorimeter at the same rate at which it is dissipated by said leak.

5. Apparatus for determining distances by radio including a focusing beam radio at one point, means for rotating said beam at a constant rate, a radio receiver at another point, and means associated with the receiver to measure the duration of the signal as the beam sweeps said other point, said means including means for converting the signal into heat, and means to measure the heat.

6. Apparatus for determining distances by radio including a focusing beam radio at one point, means for rotating said beam at a constant rate, a radio receiver at another point, means associated with the receiver to measure the duration of the signal as the beam sweeps said other point, said means including means for converting the signal into heat, and means to measure the heat, said converting means comprising an electrical circuit adapted to be established and maintained by the signal as the beam sweeps said other point.

7. Apparatus for determining distances by radio including a focusing beam radio at one point, means for rotating said beam at a constant rate, a radio receiver at another point, means associated with the receiver to measure the duration of the signal as the beam sweeps said other point, said means including means for converting the signal into heat, and means to measure the heat, said converting means comprising an electrical circuit adapted to be established and maintained by the signal as the beam sweeps said other point, and a heating element associated with the circuit and arranged in a calorimeter for measuring the heat produced therein.

8. Apparatus for determining distances by radio including a focusing beam radio at one point, means for rotating said beam at a constant rate, a radio receiver at another point, means associated with the receiver to measure the duration of the signal as the beam sweeps said other point, said means including means for converting the signal into heat, means to measure the heat, said converting means comprising an electrical circuit adapted to be established and maintained by the signal as the beam sweeps said other point, and a heating element associated with the circuit and arranged in a calorimeter for measuring the heat produced therein, said calorimeter having a leak therein and having a pyrometer connected thereto to indicate the temperature thereof, and said circuit having means for varying the heat in said heating element so that the heat supplied to and the heat dissipated from the calorimeter will balance, and means in said circuit for measuring the electricity required to so balance the calorimeter.

9. Apparatus for determining distances by radio including a focusing beam radio at one point, means for rotating said beam at a constant rate, a radio receiver at another point, means associated with the receiver to measure the duration of the signal as the beam sweeps said other point, said means including means for converting the signal into heat, means to measure the heat, said converting means comprising an electrical circuit adapted to be established and maintained by the signal as the beam sweeps said other point, and a heating element associated with the circuit and arranged in a calorimeter for measuring the heat produced therein, said calorimeter having a leak therein, and said circuit having means for varying the heat in said heating element so that the heat supplied to and the heat dissipated from the calorimeter will balance, and means in said circuit for measuring the electricity required to so balance the calorimeter.

10. That method of determining by radio the position of a receiver respecting one or more sending stations which comprises moving a radio beam so that it traverses the receiver at determinate recurrent intervals, and measuring the signals produced by movement of the beam relative to the receiver by converting the received impulses to generate heat and measuring the heat thus produced.

11. That method of determining by radio the position of a receiver respecting one or more sending stations which comprises rotating a directional radio beam alternately in opposite directions in a predetermined manner, measuring the signals produced by movement of the beam relative to the receiver by causing the received impulses to generate heat, and measuring the heat thus produced.

12. Apparatus for determining by radio the position of a receiver respecting one or more sending stations which comprises a directional radio transmitter, means for rotating said transmitter alternately in opposite directions in a predetermined manner, means associated with said receiver operable by the received impulses adapted to generate heat, and means for measuring said heat.

13. Apparatus for determining by radio the position of a receiver respecting one or more sending stations which comprises a directional radio transmitter, means for rotating said transmitter alternately in opposite directions in a predetermined manner, means associated with said receiver operable by the received impulses adapted to generate heat, said last-named means including an electrical circuit including a heating element and a switch in said circuit controlled by the received impulses, and means for measuring said heat.

14. Apparatus for determining by radio the position of a receiver respecting one or more sending stations which comprises a directional radio transmitter, means for rotating said transmitter alternately in opposite directions in a predetermined manner, means associated with said receiver operable by the received impulses adapted to generate heat, said last-named means including an electrical circuit including a heating element and a switch in said circuit controlled by the received impulses, and means for measuring said heat, said last-named means including a calorimeter having a leak therein, said circuit having means for varying the heat in said heating element so that the heat supplied to the calorimeter by said element and the heat dissipated therefrom by said leak will balance, and means in said circuit for measuring the electricity required to so balance the calorimeter.

15. Apparatus for determining by radio the position of a receiver respecting one or more sending stations which comprises a directional radio transmitter, means for rotating said transmitter alternately in opposite directions in a predetermined manner, means associated with said receiver operable by the received impulses adapted to generate heat, said last-named means including an electrical circuit including a heating element and a switch in said circuit controlled by the received impulses, and means for measuring said heat, said last-named means including a calorimeter having a leak therein and having a pyrometer connected thereto for indicating the temperature thereof, said circuit having means for varying the heat in said heating element so that the heat supplied to the calorimeter by said element and the heat dissipated therefrom by said leak will balance, and means in said circuit for measuring the electricity required to so balance the calorimeter.

WILLIAM S. JOHNSTON.